United States Patent Office 3,413,302
Patented Nov. 26, 1968

3,413,302
PHTHALOYLPYRROCOLINE COMPOUNDS
Walter R. Demler, Hamburg, N.Y., assignor to Allied Chemical Corporation, New York, N.Y., a corporation of New York
No Drawing. Filed May 17, 1965, Ser. No. 456,503
15 Claims. (Cl. 260—296)

ABSTRACT OF THE DISCLOSURE

Production of water insoluble 1-(N-arylbenzimidazolyl)-2,3-phthaloylpyrrocoline compounds having an aryl radical as N-substituent of the benzimidazolyl radical, which aryl radical has a maximum of two condensed nuclei and a maximum of 16 nuclear carbon atoms. These pyrrocoline compounds dye polyethylene terephthalate fiber from aqueous dispersions deep shades characterized by outstanding fastness to light.

---

The invention relates to new water insoluble phthaloylpyrrocoline compounds useful as coloring materials. It relates more particularly to new water insoluble 1-imidazolyl-2,3-phthaloylpyrrocolines useful as dyestuffs and pigments, a process for their manufacture, and their use in coloring synthetic resins and synthetic hydrophobic fibers, especially polyester material of the polyalkylene terephthalate type.

The 2,3-phthaloylpyrrocolines are known compounds, certain of the derivatives of which have been proposed for use as coloring materials. For example, the esters and amides, and particularly the substituted anilides of 2,3-phthaloylpyrrocoline-1-carboxylic acid, have been proposed for use as disperse dyestuffs for synthetic hydrophobic fibers. Their use is limited, however, especially when used as disperse dyestuffs for such fibers as aromatic polyester fiber material of the polyalkylene terephthalate type. Thus, the o-chloroanilide of 2,3-phthaloylpyrrocoline-1-carboxylic acid dyes "Dacron" polyester fiber pink shades which have inadequate light fastness to meet present day requirements.

The primary object of the present invention is to provide a new class of water-insoluble compounds useful as dyestuffs and pigments, which can be readily applied for the coloring of synthetic resinous and plastic materials and synthetic hydrophobic fibers, especially polyester material of the polyalkylene terephthalate type, by known coloring procedures and which produce strongly colored products having good fastness to light, as well as to washing.

Another object of the present invention is to provide a new class of water insoluble organic compounds useful as pigments and as disperse dyes for coloring synthetic hydrophobic fibrous materials in deep red shades possessing excellent fastness to light.

A further object is to provide a new class of 1-imidazolyl - 2,3 - phthaloylpyrrocoline compounds which are useful as disperse dyes for dyeing polyalkylene phthalates in deep shades having good fastness to light and to washing. (As employed herein the term "dyeing" includes various dyeing and printing procedures, and the term "dyed" includes colored material produced by dyeing and printing procedures.)

An additional object is to provide a process for the production of 1 - (N-aryl-benzimidazolyl)-2,3-phthaloylpyrrocolines.

Other objects of the invention in part will be obvious and in part will appear hereinafter.

The compounds of the present invention are water insoluble 1-benzimidazolyl-2,3-phthaloylpyrrocolines having an aryl radical as N-substituent of the benzimidazolyl radical, which aryl radical has a maximum of two condensed nuclei and a maximum of 16 nuclear carbon atoms. They are referred to hereinafter as "1-(N-arylbenzimidazolyl)-2,3-phthaloylpyrrocolines." They include compounds in which the said N-substituent is a mononuclear aryl hydrocarbon radical (e.g. phenyl, tolyl, xylyl, etc.) or a condensed or non-condensed polynuclear aryl hydrocarbon radical containing not more than two condensed nuclei (for example, naphthyl, methylnaphthyl, phenylnaphthyl, biphenyl, phenyltolyl, etc.), or a derivative of such an aryl hydrocarbon radical in which one or more nuclear hydrogen atoms are replaced by substituents selected from the group consisting of lower alkyl, lower alkoxy and bis(lower alkyl)amino radicals, said substituents being the same or different when more than one. (The term "lower," as employed herein, including the claims, when used in connection with alkyl and related radicals, denotes radicals having 1 to 6 carbon atoms.)

They also include compounds in which the phthaloylpyrrocolyl nucleus and the benzimidazolyl nucleus are both free from further substituents, or in which one of them is further substituted and the other is not, or in which both of them are further substituted. Thus, the phthaloylpyrrocolyl nucleus may be further substituted by one or more substituents selected from the group consisting of halogen, nitro, lower alkyl, lower alkoxy and acetylamino, which may be the same or different when more than one; and the benzimidazolyl nucleus may be further substituted by one or more substituents selected from the group consisting of halogen, perhalo-lower alkyl and lower alkoxy, which may be the same or different when more than one. Being water-insoluble compounds, they are free from substituents which impart water solubility to the molecule.

The 1-(N-aryl-benzimidazoyl) - 2,3 - phthaloylpyrrocolines of the present invention correspond to the formula

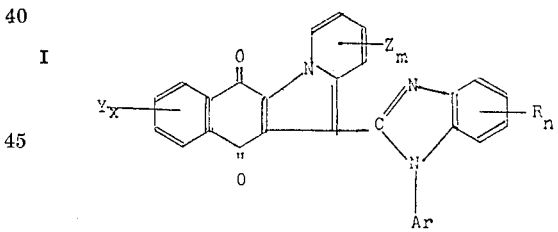

I wherein

Y and Z each represent substituents selected from the group consisting of halogen, nitro, lower alkyl, lower alkoxy and acylamino,
R represents substituents selected from the group consisting of halogen, nitro, lower alkyl, perhalo-lower alkyl and lower alkoxy,
$x$, $m$ and $n$ each represent 0–3, and
Ar represents an aryl radical selected from the group consisting of phenyl, naphthyl, and their lower alkyl, lower alkoxy, bis(lower alkyl) amino and phenyl derivatives.

I have discovered that the said water-insoluble compounds constitute a group of improved coloring materials useful as pigments for synthetic resinous and plastic materials and as dyes for synthetic hydrophobic fibers; they produce attractive, generally deep colors having good fastness properties, particularly when applied for the coloring of synthetic thermoplastic polymers and resins and for the dyeing of synthetic hydrophobic materials, and especially as disperse dyes for dyeing aromatic polyester material of the polyalkylene terephthalate type.

Those in which the phthaloylpyrrocolyl and benzimidazolyl nuclei are free from further substituents (that is, in which the 1-benzimidazolyl-2,3-phthaloylpyrrocoline radical is free from further substituents) are preferred in view of the exceptional fastness to light of the colored resins and plastics and the dyeings of aromatic polyester material of the polyalkylene terephthalate type obtained with them. And those in which the N-aryl substituent of the benzimidazolyl nucleus is phenyl or lower alkoxyphenyl are preferred for the production of deep red colorations having outstanding light fastness properties. Thus, I have discovered that they color said aromatic polyester material, and especially polyalkylene terephthalate fibrous material (such as "Dacron," "Terylene," "Kodel," and the like), in deep red shades having good fastness to washing and exceptional fastness to light (they do not undergo alternation in shade upon long exposure to light) when applied to said material from their aqueous suspensions in the customary manner, or by other dyeing or printing procedures.

The present invention includes a process for the manufacture of said 1-(N-aryl-benzimidazolyl)-2,3-phthaloylpyrrocoline compounds which comprises heating a 2,3-phthaloylpyrrocoline-1-carboxy-orthohaloanilide with an excess of an aryl primary monoamine having a maximum of two condensed nuclei and a maximum of 16 carbon atoms, an acid binding agent, and a copper condensing agent, and removing water formed in the reaction.

The reactions which occur are represented by the following simple equation:

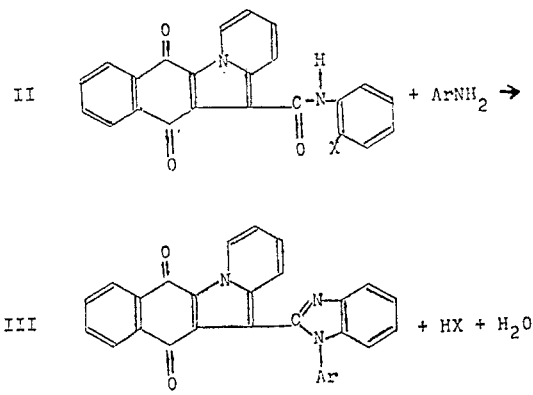

wherein

Ar represents an aryl radical having a maximum of two condensed nuclei and a maximum of 16 carbon atoms, and especially one selected from the group consisting of phenyl, naphthyl, and their lower alkyl, lower alkoxy, bis(lower alkyl)amino and phenyl derivatives, and X represents a halogen, especially chlorine or bromine.

In carrying out the manufacture of said compounds in accordance with a preferred method of procedure, 1 mol of a suitable 2,3 - phthaloylpyrrocoline - 1-carboxy-orthochloro (or bromo) anilide is heated with at least 30 mols of an aryl primary monoamine of the type referred to above, in the presence of an excess of an acid acceptor or acid binding agent (e.g. about 5 mols) and about 1 to 2 mols of a condensing agent, while removing from the reaction mass water formed in the condensation reaction.

Various 2,3-phthaloylpyrrocoline-1-carboxy-ortho-haloanilides can be employed as starting materials for the process. Examples of suitable orthohaloanilides are:

ortho-chloroanilide of 2,3-phthaloylpyrrocoline 1-carboxylic acid
ortho-bromoanilide of 2,3-phthaloylpyrrocoline 1-carboxylic acid
ortho-iodoanilide of 2,3-phthaloylpyrrocoline 1-carboxylic acid
2,4-dichloroanilide of 2,3-phthaloylpyrrocoline 1-carboxylic acid
6-chloro-orthotoluidide of 2,3-phthaloylpyrrocoline 1-carboxylic acid
6-bromo-orthotoluidide of 2,3-phthaloylpyrrocoline 1-carboxylic acid
2-chloro-4-nitroanilide of 2,3-phthaloylpyrrocoline 1-carboxylic acid
2-chloro-5-trifluoromethylanilide of 2,3-phthaloylpyrrocoline 1-carboxylic acid
6-chloro-2,4-dimethoxyanilide of 2,3-phthaloylpyrrocoline 1-carboxylic acid
ortho-chloroanilide of 4'-chloro-2,3-phthaloylpyrrocoline 1-carboxylic acid
ortho-chloroanilide of 5'-chloro-2,3-phthaloylpyrrocoline 1-carboxylic acid
ortho-chloroanilide of 4',5'-dichloro-2,3-phthaloylpyrrocoline 1-carboxylic acid
ortho-chloroanilide of 4',5'-dibromo-2,3-phthaloylpyrrcoline 1-carboxylic acid
ortho-chloroanilide of 6-methyl-2,3-phthaloylpyrrocoline 1-carboxylic acid
ortho-chloroanilide of 7-methyl-2,3-phthaloylpyrrocoline 1-carboxylic acid
ortho-chloroanilide of 3'-nitro-2,3-phthaloylpyrrocoline 1-carboxylic acid
ortho-chloroanilide of 6'-nitro-2,3-phthaloylpyrrocoline 1-carboxylic acid
ortho-chloroanilide of 4'-chloro-6-methyl-2,3-phthaloylpyrrocoline 1-carboxylic acid.

They are readily obtained by reaction of a 2,3-phthaloylpyrrocoline 1-carbonyl halide and an ortho-halo aniline as disclosed, for example, in U.S. Patent 2,863,714 and Example 5 of U.S. Patent 2,877,230.

The preferred compounds of the present invention are obtained by employing the ortho-chloroanilide or the orthobromoanilide of 2,3-phthaloylpyrrocoline 1-carboxylic acid itself (that is, free from further substituents).

Various aryl primary monoamines of the type referred to above can be employed for reaction with the ortho-haloanilide. Representative monoamines of this class are:

aniline
o-Toluidine, its ethyl, propyl and butyl homologues
m-Toluidine, its ethyl, propyl and butyl homologues
p-Toluidine, its ethyl, propyl and butyl homologues
o-Phenyl-aniline
m-Phenyl-aniline
p-Phenyl-aniline
o-Anisidine (o-methoxyaniline)
m-Anisidine
p-Anisidine
o-Phenetidine (o-ethoxyaniline)
m-Phenetidine
p-Phenetidine
o-Propoxyaniline
m-Propoxyaniline
p-Propoxyaniline
o-Butoxyaniline
m-Butoxyaniline
p-Butoxyaniline
2-methylnaphthylamine
2-ethylnaphthylamine
2-methoxynaphthylamine
2-ethoxynaphthylamine
2,4-dimethylaniline
2,4-dimethoxyaniline
cumidine.

Preferably a mononuclear aryl primary monoamine which is a liquid at temperatures above 100° C. at atmospheric pressure (such as aniline, p-toluidine, p-anisidine or p-phenetidine) is used so as to provide a liquid reaction medium without requiring an additional solvent or diluent, although the invention includes the use of the latter if desired or needed.

The amount of monoamine employed is preferably at least 30 mols per mol of the 2,3-phthaloylpyrrocoline 1-carboxy-orthohaloanilide. When used as reaction medium a sufficiently large quantity of amine is used to provide a fluid reaction mass; accordingly the molar ratio of amine to anilide will vary with the particular aromatic amine charged. Thus, aniline is used advantageously in a mol ratio of 60:1; p-anisidine or p-phenetidine can be employed in a mol ratio of only about 30:1 to 40:1.

Various acid acceptors or acid binding agents and condensing agents can be employed as is usual in the condensation of a haloanilide with an arylamine. Suitable acid acceptors include sodium carbonate, sodium acetate, potassium carbonate and potassium acetate. Copper condensing agents, of which cuprous chloride, copper carbonate and copper oxide are examples, are employed since they assist both in the condensation of the haloanilide with the arylamine and in the formation of the benzimidazol ring.

The reaction is preferably carried out by heating the above mixture, while permitting vapors of water and any other volatile by-products formed in the reaction (such as acetic acid, when sodium acetate is used) to distill off, until condensation and formation of the benzimidazol ring is completed. The reaction is advantageously carried out by heating the mixture at about 185–190° C. for 10 to 15 hours while permitting water and any other volatile by-products formed in the reaction to distill off. The product, which is insoluble, is recovered in any suitable manner; as by filtration, washing of the filter-cake, and drying. If desired, the product can be conditioned in known manner (as by acid pasting from sulfuric acid, or grinding) and converted to a dye paste, dye powder or dyebath in the manner known for preparing other so called "disperse dyes."

The compounds of the present invention are suitable for dyeing polyalkylene terephthalate particularly polyethylene terephthalate ("Dacron") by any of the known methods of applying disperse dyes including the well-known "Thermosol" process. They are also suitable for the disperse dyeing of fibers, films and foils of other synthetic hydrophobic material, including secondary cellulose acetate, cellulose triacetate, polyhexamethylene adipamide (nylon 66) and poly ε-caprolactam (nylon 6). They can be employed in a finely divided state as pigments for coloring spinning compositions (for example, of polyurethanes, polyacrylonitrile and nylons); lacquers and lacquer formers; natural substances of high molecular weight (such as gums), and synthetic resins, including condensation resins (for example, aminoplasts and phenolplasts) and polymerization resins (including polyvinyl chloride, polyethylene, polypropylene and particularly polystyrene).

The following examples describe specific embodiments of the invention and illustrate the best method contemplated for carrying it out; but they are not to be interpreted as limiting the invention to all details thereof, since changes can be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

In evaluating the 1-(N-aryl-benzimidazolyl)-2,3-phthaloylpyrrocoline products of the specific examples as dyes for "Dacron" polyester fiber, they were converted to dyestuff pastes which were employed for dyeing "Dacron" polyester cloth by the known "Thermosol" process, as set out in the following "Dyeing Procedure."

In evaluating the 1-(N-aryl-benzimidazolyl)-2,3-phthaloylpyrrocoline products as pigments, they were employed for the coloring of polystyrene resin by the following known "Plastic Coloring Procedure."

DYEING PROCEDURE

A dyestuff paste was prepared by slurrying the dry powder product (1 part) with sodium lignin sulfonate ("Polyfon XTH," 4 parts), the sodium salt of a sulfonated naphthalene-formaldehyde condensation product ("Tamol N," 0.5 part), Ottawa sand (15 parts) and water (125 parts), agitating for 16 hours, and filtering through a 40-mesh screen. The dyestuff paste (100 parts by volume) was padded on "Dacron" polyester cloth (10 parts), and the padded cloth was dried and then heated at 220° for 2 minutes. To remove residual surface color, the dyed cloth was immersed for 10 minutes at 60° in an aqueous solution (400 parts) containing sodium hydroxide (2 parts per 1000 parts by volume of solution) and a higher alkyl benzene sodium sulfonate detergent ("Nacconol NR," 5 parts per 1000 parts by volume of solution), then was washed with an aqueous soap solution (400 parts containing 0.5% of soap by weight), rinsed with water, and again washed with soap solution (400 parts), rinsed and dried.

PLASTIC COLORING PROCEDURE

A mixture of polystyrene pellets (100 parts) and the dry powder product (0.05 part) was tumbled mechanically in a metal container for 5 minutes to surface coat the resin with the pigment. The coated resin was then fed through a laboratory extruder of which the die was heated to about 232° (the portion of the barrel near the feed inlet maintained at about 191°, and the portion of the barrel near the die being maintained at about 204°). The mass was extruded as a continuous, transparent colored rod about ⅛" in diameter. The rod was pelletized, and the colored pellets were fed to an injection molding apparatus, operating at about 193°, which formed them into plaques approximately 2" x 3" x ¼". The plaques were examined for color and transparency.

Example 1

A mixture of 2,3-phthaloylpyrrocoline-1-carboxyorthochloroanilide (10 parts, 0.025 mol), anhydrous sodium acetate (10 parts), cuprous chloride (0.5 part) and p-anisidine (100 parts, 0.81 mol) was charged to a reaction vessel and heated and agitated under reflux for ten hours at 185°, while allowing water and acetic acid formed during the reaction to distill from the reaction vessel. After cooling to ambient temperature, the reaction mass was filtered with suction and the filter cake obtained was washed first with p-anisidine and then with alcohol (denatured, Formula 2B). The cake was slurried in hot water (500 parts), acidified with hydrochloric acid (20° Bé.), filtered, washed free of acid, and dried. A yield of 5.4 parts of 1-(N-p-methoxyphenyl-benzimidazolyl)-2,3-phthaloylpyrrocoline, corresponding to the formula

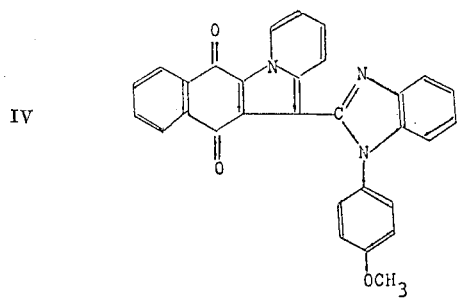

IV was thus obtained.

The product of this example was conditioned and converted to a dyestuff paste as follows: The dry product (5 parts) was dissolved in concentrated sulfuric acid (91.7 parts; 66° Bé.) at ambient temperature, the solution was drowned in water, and the resulting precipitate was filtered off and washed free of acid. The filter cake was converted to a dyestuff paste in a manner similar to that set out in the above dyeing procedure but without the sodium lignin sulfonate. When employed for dyeing "Dacron" polyester cloth by the above dyeing procedure, it gave deep red dyeings which showed substantially no alteration in shade on exposure to light for 300 hours in a "Fade-Ometer."

Example 2

In a manner similar to that employed in Example 1, p-phenetidine (106 parts, 0.77 mol) and 2,3-phthaloyl-pyrrocoline-1-carboxy-orthochloranilide (10 parts, 0.025 mol) were reacted in the presence of anhydrous sodium acetate (10 parts) and cuprous chloride (0.5 part) to produce 5.0 parts of 1-(N-p-ethoxyphenyl-benzimidazolyl)-2,3-phthaloylpyrrocoline, corresponding to the formula

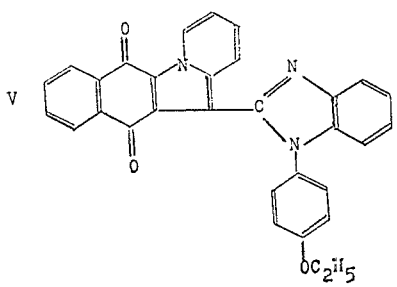

V

When the product was conditioned, converted to a dye-stuff paste and dyed on "Dacron" polyester cloth in the manner of the product of Example 1, the resulting dyeings were a deep red color and showed substantially no alteration in shade on exposure to light for 300 hours in a "Fade-Ometer."

Example 3

By a procedure similar to that described in Example 1, the reaction of aniline (204 parts, 2.19 mols), 2-3-phthaloylpyrrocoline - 1 - carboxy-orthochloroanilide (15 parts, 0.037 mol), anhydrous sodium acetate (15 parts) and cuprous chloride (0.5 part) produced 8.3 parts of 1-(N-phenyl-benzimidazolyl) - 2,3 - phthaloylpyrrocoline, corresponding to the formula

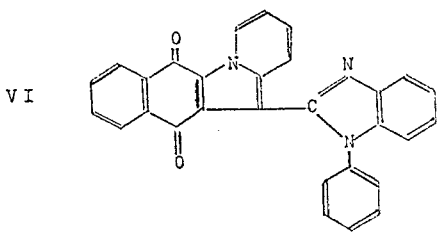

VI

When converted to a dyestuff paste and employed for dyeing "Dacron" polyester cloth by the above dyeing procedure, it gave deep red dyeings which showed no alteration in shade on exposure to light for 100 hours in a "Fade-Ometer."

When employed as a pigment for polystyrene by the above plastic coloring procedure, transparent plaques which were colored an attractive bluish red were obtained.

Example 4

In a manner similar to that employed in Example 1, the 2,4-dichloroanilide of 2,3-phthaloylpyrrocoline-1-carboxylic acid (10 parts, 0.023 mol, which had been prepared by the reaction of 2,3-phthaloylpyrrocoline-1-carbonyl chloride and 2,4-dichloroaniline in the manner disclosed in U.S. Patent 2,863,714) was treated with anhydrous sodium acetate (10 parts), cuprous chloride (0.3 part), and aniline (153 parts, 1.64 mol) to produce 5.1 parts of the compound corresponding to the formula

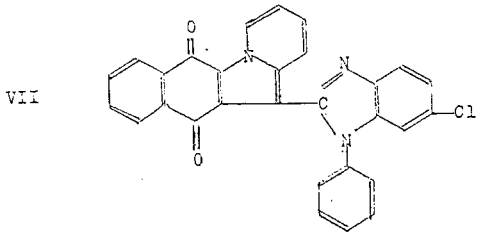

VII

When converted to a dyestuff paste and employed for dyeing "Dacron" polyester cloth by the above dyeing procedure, it gave good pink dyeings which showed no alteration in shade on exposure to light for 100 hours in a "Fade-Ometer."

Example 5

By a procedure similar to that of Example 1, the 6-chloro-orthotoluidide of 2,3-phthaloylpyrrocoline-1-carboxylic acid (10 parts, 0.024 mol, which had been prepared by the reaction of 2,3-phthaloylpyrrocoline-1-carbonyl chloride and 6 chloro-orthotoluidine by the method of U.S. Patent 2,863,714) was treated with aniline (92 parts, 0.99 mol) in the presence of anhydrous sodium acetate (10 parts) and cuprous chloride (0.3 part) to produce 3.6 parts of the compound corresponding to the formula

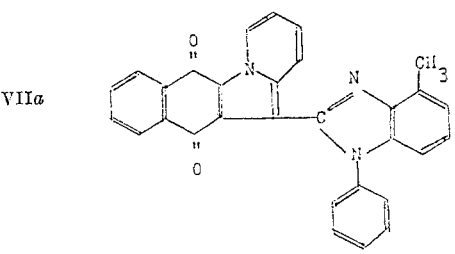

VIIa

When converted to a dyestuff paste and employed for dyeing "Dacron" polyester cloth by the above dyeing procedure, it gave excellent red dyeings which showed no alteration in shade on exposure to light for 70 hours in a "Fade-Ometer."

Example 6

By a procedure similar to that of Example 1, the 2-chloro-5-trifluoromethylanilide of 2,3-phthaloylpyrrocoline-1-carboxylic acid (10 parts, 0.021 mol, which had been prepared by reaction of 2,3-phthaloylpyrrocoline-1-carbonyl chloride and 4-chloro-3-aminobenzotrifluoride by the method of U.S. Patent 2,863,714), was treated with aniline (153 parts, 1.64 mol), anhydrous sodium acetate (10 parts) and cuprous chloride (0.3 part) to produce 7.3 parts of the compound corresponding to the formula

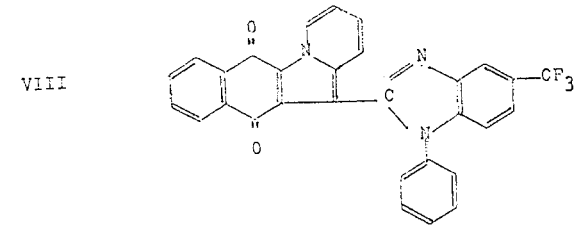

VIII

When converted to a dyestuff paste and employed for dyeing "Dacron" polyester cloth by the above procedure, it gave good pink dyeings.

Example 7

By a process similar to that of Example 1, the 2-chloro-4-nitroanilide of 2,3-phthaloylpyrrocoline-1-carboxylic acid (10 parts, 0.0225 mol) was treated with aniline (204 parts, 2.19 mol), anhydrous sodium acetate (10 parts) and cuprous chloride (0.5 part) to produce 7.0 parts of compound corresponding to the formula

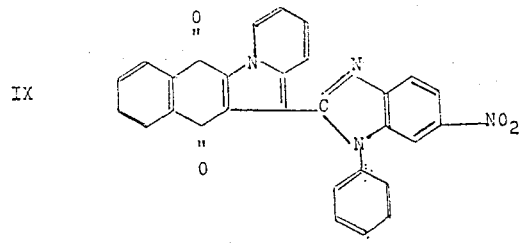

IX

When converted to a dyestuff paste and employed for dyeing "Dacron" polyester cloth by the above dyeing procedure, it gave good red dyeings.

It will be evident to those skilled in the art that the invention is not limited to the details of the foregoing illustrative examples and that changes can be made without departing from the scope of the invention.

Thus, in preparing the compounds of the present invention, other aryl primary monoamines may be substituted for those employed in the examples, such as those set out above; and the ortho-bromoanilide of 2,3-phthaloyl-pyrrocoline-1-carboxylic acid may be used instead of the ortho-chloroanilide. Further, other acid accepting agents and other condensing agents (such as those set out above) may be used instead of the sodium acetate and cuprous chloride, respectively.

The coloring, and particularly the dyeing and printing, of polyethylene terephthalate fiber and other aromatic polyester material of the polyalkylene terephthalate type can be carried out by any of the other methods heretofore known for the coloring of such material. It is a feature of the present invention that the compounds of the present invention do not require any special dyeing or printing technique for their successful application to said material. Hence they may be applied from aqueous dispersions, in the manner of the well known "disperse dyes," by the various methods heretofore described as useful for the application to said aromatic polyester material of the water-insoluble dyes normally used for the dyeing and printing of said material.

I claim:

1. The 1 - (N-aryl-benzimidazolyl) - 2,3 - phthaloyl - pyrrocolines corresponding to the formula

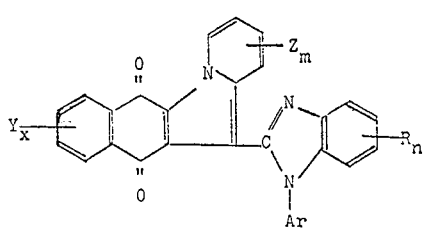

wherein
Y and Z each represent substituents selected from the group consisting of halogen, nitro and lower alkyl,
R represents substituents selected from the group consisting of halogen, nitro, lower alkyl, lower alkoxy and perhalo-lower alkyl
x, m and n each represent 0–2, and
Ar represents an aryl radical selected from the group consisting of phenyl, naphthyl, and their lower alkyl, lower alkoxy, bis(lower alkyl)amino and phenyl derivatives.

2. A 1-(N-arylbenzimidazolyl)-2,3 - phthaloylpyrrocoline as defined in claim 1 wherein the 1-benzimidazolyl-2,3-phthaloylpyrrocoline radical is free from further substituents.

3. A 1-(N-arylbenzimidazolyl)-2,3 - phthaloylpyrrocoline wherein the N-aryl radical is lower alkoxy-phenyl and the 1-benzimidaolyl-2,3-phthaloylpyrrocoline radical is free from further substituents.

4. A 1-(N-aryl-benzimidazolyl)-2,3 - phthaloylpyrrocoline corresponding to the formula

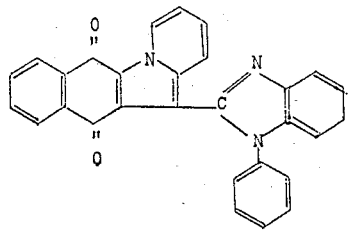

5. A 1-(N-aryl-benzimidazolyl)-2,3 - phthaloylpyrrocoline corresponding to the formula

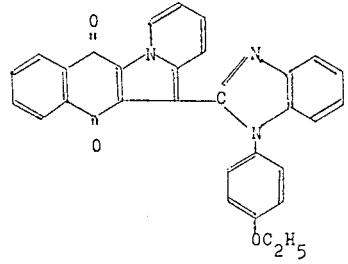

6. A 1-(N-aryl-benzimidazolyl)-2,3 - phthaloylpyrrocoline corresponding to the formula

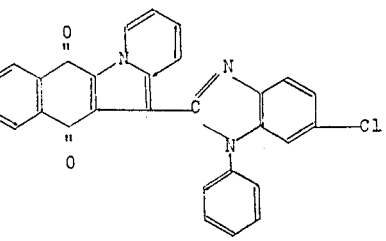

7. A 1-(N-aryl-benzimidazolyl)-2,3 - phthaloylpyrrocoline corresponding to the formula

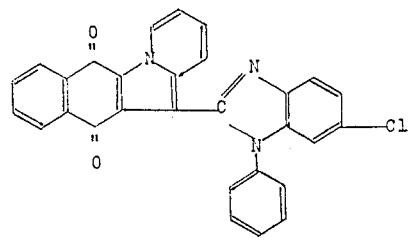

8. A 1-(N-aryl-benzimidazolyl)-2,3 - phthaloylpyrrocoline corresponding to the formula

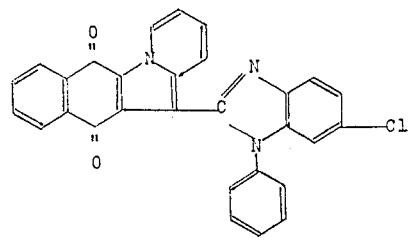

9. A 1-(N-aryl-benzimidazolyl) - 2,3-phthaloylpyrrocoline as defined in claim 1 where Ar represents a aryl radical selected from the group consisting of phenyl and a lower alkyl, lower alkoxy, bis(lower alkyl)amino and phenyl derivative thereof.

10. A 1-(N-aryl-benzimidazolyl)-2,3 - phthaloylpyrrocoline as defined in claim 1 wherein Ar represents an aryl radical selected from the group consisting of naphthyl and a lower alkyl, lower alkoxy, bis(lower alkyl)amino and phenyl derivative thereof.

11. A 1-(N-aryl-benzimidazolyl) - 2,3 - phthalopyrrocoline as defined in claim 1 wherein Ar is phenyl.

12. A 1-(N-aryl-benzimidazolyl) - 2,3 - phthalopyrrocoline as defined in claim 1 wherein Ar is a lower alkoxy substituted phenyl.

13. A 1-(N-arylbenzimidazolyl)-2,3 - phthaloylpyrrocoline as defined in claim 2 where Ar represents an aryl radical selected from the group consisting of phenyl and a lower alkyl, lower alkoxy, bis(lower alkyl)amino and phenyl derivative thereof.

14. A 1-(N-aryl-benzimidazolyl)-2,3 - phthaloylpyrrocoline as defined in claim 2 wherein Ar represents an aryl radical selected from the group consisting of naphthyl and a lower alkyl, lower alkoxy, bis(lower alkyl)amino and phenyl derivative thereof.

15. A 1-(N-aryl-benzimidazolyl)-2,3 - phthaloylpyrrocoline as defined in claim 2 wherein Ar is a lower alkoxy substituted phenyl.

References Cited
UNITED STATES PATENTS 2,772,272    11/1956    Schmidt-Nickels _____ 260—295

HENRY R. JILES, *Primary Examiner.*

A. ROTMAN, *Assistant Examiner.*